US010351006B2

(12) United States Patent
Lannoije et al.

(10) Patent No.: US 10,351,006 B2
(45) Date of Patent: Jul. 16, 2019

(54) INDUCTIVE POWER TRANSFER FOR TRANSFERRING ELECTRIC ENERGY TO A VEHICLE

(71) Applicant: Bombardier Primove GmbH, Berlin (DE)

(72) Inventors: Marnix Lannoije, Balen (BE); Robert Czainski, Szczecin (PL); Dominik Anders, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 330 days.

(21) Appl. No.: 15/101,596

(22) PCT Filed: Dec. 5, 2014

(86) PCT No.: PCT/EP2014/076798
§ 371 (c)(1),
(2) Date: Jun. 3, 2016

(87) PCT Pub. No.: WO2015/082714
PCT Pub. Date: Jun. 11, 2015

(65) Prior Publication Data
US 2016/0325631 A1 Nov. 10, 2016

(30) Foreign Application Priority Data
Dec. 6, 2013 (GB) .................................. 1321575.1

(51) Int. Cl.
*B60L 53/12* (2019.01)
*B60L 11/18* (2006.01)
(Continued)

(52) U.S. Cl.
CPC ............. *B60L 11/182* (2013.01); *B60L 53/12* (2019.02); *B60L 53/305* (2019.02); *B60L 53/38* (2019.02);
(Continued)

(58) Field of Classification Search
None
See application file for complete search history.

(56) References Cited

U.S. PATENT DOCUMENTS

2010/0117596 A1  5/2010  Cook et al.
2011/0184842 A1  7/2011  Melen
(Continued)

FOREIGN PATENT DOCUMENTS

CN  102385069 A  3/2012
CN  102474119 A  5/2012
(Continued)

*Primary Examiner* — Thienvu V Tran
*Assistant Examiner* — David M Stables
(74) *Attorney, Agent, or Firm* — The Webb Law Firm

(57) ABSTRACT

An inductive power transfer system for transferring electric energy to a vehicle. The system includes a wayside electric conductor arrangement and a vehicle side receiving device. The wayside electric conductor arrangement is combined with an array of a plurality of sensor coils, placed side by side to form the array. The array extends in directions transverse to a field direction of the electromagnetic field, which field direction extends from the wayside electric conductor arrangement to the vehicle side receiving device during transfer of the energy to the vehicle. A detector arrangement is connected to the plurality of the sensor coils and adapted to detect an effect of any magnetic and/or electrically conducting body, that is possibly located in the field direction on at least one electrical property of at least one of the sensor coils. At least one marker body is combined with the vehicle side receiving device. A position determining device is connected to the detector arrangement and adapted to determine a position of the vehicle side receiving device. The invention also relates to a method of operating and of manufacturing an inductive power transfer system.

14 Claims, 7 Drawing Sheets

(51) Int. Cl.
  *B60L 53/38* (2019.01)
  *B60L 53/60* (2019.01)
  *B60L 53/65* (2019.01)
  *B60L 53/30* (2019.01)

(52) U.S. Cl.
  CPC ............ *B60L 53/60* (2019.02); *B60L 53/65* (2019.02); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2012/0098483 A1 | 4/2012 | Patel | |
| 2012/0181875 A1* | 7/2012 | Wechlin | B60L 3/00 307/104 |
| 2012/0187773 A1 | 7/2012 | Wechlin et al. | |
| 2012/0203410 A1 | 8/2012 | Wechlin et al. | |
| 2013/0069441 A1 | 3/2013 | Verghese et al. | |
| 2014/0139038 A1 | 5/2014 | Konno et al. | |
| 2014/0145514 A1 | 5/2014 | Konno et al. | |
| 2014/0174870 A1 | 6/2014 | Niizuma | |
| 2015/0045091 A1 | 2/2015 | Nakatani | |

FOREIGN PATENT DOCUMENTS

| | | |
|---|---|---|
| CN | 102555832 A | 7/2012 |
| CN | 104094530 B | 11/2016 |
| EP | 2301133 A1 | 3/2011 |
| EP | 2757657 A1 | 7/2014 |
| JP | 2013066291 A | 4/2013 |
| WO | 2010006078 A1 | 1/2010 |
| WO | 2011006884 A2 | 1/2011 |
| WO | 2012165243 A1 | 6/2012 |
| WO | 2012136303 A2 | 10/2012 |
| WO | 2012164973 A1 | 12/2012 |
| WO | 2013039143 A1 | 3/2013 |
| WO | 2013127445 A1 | 9/2013 |

* cited by examiner

INDUCTIVE POWER TRANSFER FOR TRANSFERRING ELECTRIC ENERGY TO A VEHICLE

CROSS-REFERENCE TO RELATED APPLICATIONS

This application is the United States national phase of International Application No. PCT/EP2014/076798 filed Dec. 5, 2014, and claims priority to United Kingdom Patent Application No. 1321575.1 filed Dec. 6, 2013, the disclosures of which are hereby incorporated in their entirety by reference.

BACKGROUND OF THE INVENTION

Field of the Invention

The invention relates to an inductive power transfer system for transferring electric energy to a vehicle, wherein the system comprises a wayside (primary side) electric conductor arrangement for producing an alternating electromagnetic field and for thereby transferring the energy to the vehicle and comprises a vehicle side (secondary side) receiving device for receiving the alternating electromagnetic field and for producing electric energy by magnetic induction. Furthermore the invention relates to a vehicle comprising the vehicle side receiving device. The invention also relates to an arrangement comprising the wayside electric conductor arrangement. In addition, the invention relates to a method of operating an inductive power transfer system for transferring electric energy to a vehicle. A method of manufacturing an inductive power transfer system for transferring electric energy to a vehicle is also part of the invention.

Description of Related Art

WO 2012/136303 A1 discloses a system for the contactless transmission of energy from a primary winding to a vehicle comprising a secondary winding which can be inductively coupled to the primary winding, discloses a method for detecting metal pieces in the system, discloses a method for positioning a vehicle, discloses a method for determining a direction and discloses a positioning control method, wherein the primary winding is arranged in a stationary manner and can be acted upon by an alternating current. A winding arrangement is arranged in a stationary manner, said winding arrangement having a first winding and a second winding, in particular wherein the winding arrangement is arranged centrally with respect to the primary winding, wherein the first and second windings are each composed of at least two part windings. The surfaces around which the part windings of a particular winding are wound are exposed to a magnetic flux generated by the primary winding and are spaced apart from one another, in particular in such a manner that no flux line of the flux generated by the primary winding passes through said surfaces together, wherein the part windings each have such a winding number and such a surface around which said part windings wind that the voltages of the part windings, which voltages are induced by the, in particular changing, magnetic flux of the primary winding are identical in magnitude, and in particular wherein the first winding is arranged rotated with respect to the second winding in such a manner that each part winding of the first winding is arranged inductively coupled to each part winding of the second winding.

For example, as disclosed in WO 2012/136303 A1, it has been proposed earlier to transfer electric energy to a vehicle in a contactless manner, by magnetic induction. One advantage is that no cable connection to the vehicle is required. On the other hand, the primary side electric conductor arrangement for generating the alternating electromagnetic field and the secondary side receiving device should be positioned vis-à-vis. Any lateral displacement compared to the optimum position or optimum range of positions reduces the efficiency of energy transfer. Another problem is the possibility of electrically conducting objects being in between the primary and secondary side of the inductive power transfer (IPT) system. In particular, metal objects, including metallized objects, will be rapidly heated during contactless energy transfer and might damage parts of the system, might injure people and/or might catch fire.

WO 2012/136303 A1 proposes a system including additional winding arrangements on both sides, the primary side and the secondary side, for position detection of the secondary side receiving device. An alternating voltage is applied to a first winding of the winding arrangement which is combined with the primary side electric conductor arrangement. The vehicle is steered into that direction where the amounts of voltages induced in part windings of the winding arrangement on the secondary side reach a maximum, wherein the induced voltages comprise a phase shift of essentially 180° relative to the alternating voltage.

This means that the position of the vehicle or of the secondary side receiving device is determined on the secondary side. On the other hand, as mentioned, winding arrangements are required on both, the primary side and the secondary side in addition to the devices which are necessary for the energy transfer.

SUMMARY OF THE INVENTION

The invention in particular relates to an embodiment of the IPT system in which the primary side conductor arrangement generates the electromagnetic field in such a manner that the magnetic field lines at the location of the highest magnetic field intensity within the region in between the primary side and the secondary side of the IPT system extend in a direction perpendicular to the ground on which the vehicle may travel. "Ground" means the general course of the ground surface, so that there may be protrusions or corrugations at the ground surface on a scale smaller than the dimensions of the vehicle which do not affect the orientation of the primary side conductor arrangement. Generally speaking, the direction of the magnetic field lines mentioned before is the vertical direction in most cases and in particular in these cases in which the ground surface extends within a horizontal plane on which the vehicle may drive.

In particular, the primary side conductor arrangement may comprise at least one coil of an electric line for generating the electromagnetic filed for energy transfer. The area which is enclosed by the coil or is covered by the coil may extend parallel to the course of the ground surface or within the ground surface.

The electromagnetic field which is generated by the primary side conductor arrangement may cause undesired effects in the ambience. Corresponding EMC limits are to be observed. If the secondary side receiving device is positioned close to the primary side conductor arrangement, in particular above the primary side conductor arrangement, it covers the conductor arrangement at least partly. It is preferred that the whole receiving area of the receiving device which receives the electromagnetic field or the magnetic component of the field covers an equally large corresponding area of the primary side conductor arrangement during operation of the IPT system. If the receiving device is displaced in lateral direction so that at least a part of the receiving device does not cover a region of the primary side conductor arrangement vis-à-vis and, therefore, magnetic field lines in the region of the highest magnetic field intensity pass the receiving device, the EMC limits may not be met. This is another reason why the secondary side receiving device should be positioned at a predetermined location or within a predetermined range of positions relative to the primary side conductor arrangement.

It is an object of the present invention to enable position detection of the secondary side receiving device relative to the primary side conductor arrangement, wherein the effort for providing devices in order to detect the relative position shall be low.

It is a basic finding of the invention that winding arrangements on both sides, the primary side and the secondary side of the IPT system, are not necessary. In particular, a sensor arrangement on the primary side (wayside) is sufficient for position detection, provided that the secondary side has a characteristic, the position of which can be detected by the primary side sensor device.

The position or alignment of the vehicle or of the secondary side receiving device, which is detected using the primary side sensor device, can be used in different manners for steering the vehicle to the optimum position or the optimum range of positions. One way is to signal the present position and/or the information how to steer the vehicle to the vehicle's driver based on the determined position and/or alignment. Another way is to transmit this position, this alignment and/or this information to the vehicle, for example by communication systems known from the prior art, such as according to the Bluetooth standard or according to near field communication (NFC). Then, a device onboard the vehicle may display the position, alignment and/or information and/or may automatically steer or support steering the vehicle to the optimum position or optimum range of positions. In all cases mentioned above or below, which refer to an optimum position or optimum range of positions, this also includes the possibility that the vehicle is aligned in an optimum manner.

Another way is to use the position, alignment or information by a primary side device or system which either moves the primary side conductor arrangement or the secondary side receiving device or the vehicle or devices on both sides so that the optimum position or optimum range of positions is achieved.

Preferably, the vehicle or the secondary side receiving device has a characteristic which allows the primary side sensor device to determine its position. If the characteristic is a marker made of electrically conducting material, the primary side sensor device can also be used for detecting an electrically conducting material in the power transfer region between the primary side conductor arrangement and the secondary side receiving device. Such a material and the marker can be determined in the same manner using the same function of the sensor device. In addition or alternatively, the primary side sensor device may be adapted to receive communication signals from a transmitter mounted to the vehicle or to the secondary side receiving device and the communication signal may be used to detect a position of the secondary side receiving device. This means that the primary side sensor device may be adapted to either detect undesired electrically conducting material in the IPT region or to receive communication signals from the secondary side, or both.

In particular, the primary side sensor device comprises an array of a plurality of sensor coils. Each sensor coil may enclose or cover an area through which the field lines of the magnetic field produced by the primary side conductor arrangement extend during power transfer to the secondary side receiving device. Each sensor coil may comprise one or more turns of an electric conductor.

It is preferred that each sensor coil of the array encloses or covers an individual area which is not enclosed or covered by another sensor coil of the array, i.e. there is no overlap. In this manner, the sensor coil and, thereby, the assigned areas of the sensor coils may form a two-dimensional matrix, wherein each location of the matrix is unambiguously assigned to one particular sensor coil or, optionally, to an area in between two or more neighboring sensor coils. In this case, no location of the matrix is assigned to two or more sensor coils. This means that any signal or influence which acts on the matrix of sensor coils can be assigned to one particular sensor coil or, optionally, to the area in between two or more sensor coils.

For example, the function principle of an inductive metal detector for detecting metal objects can be applied in order to determine the one particular coil which is most affected by the signal or influence. This one particular coil is, therefore, the sensor coil nearest to the transmitter of the signal, the sensor coil which is targeted by the signal transmitter and/or is the sensor coil nearest to the object which causes the influence on the sensor device.

In particular, the matrix may be formed by the sensor coils being arranged in rows and columns. This facilitates the determination of the position of the marker, of electrically conducting material and/or of the signal transmitter. However, a matrix comprising sensor coils not being arranged in rows and columns is also possible. For example, groups of the sensor coils may form individual clusters each comprising a plurality of the sensor coils. According to another option, the sensor coils may be arranged along concentric circular lines having different radii.

In particular, the following is proposed: an inductive power transfer system for transferring electric energy to a vehicle, wherein the system comprises a wayside electric conductor arrangement for producing an alternating electromagnetic field and for thereby transferring the energy to the vehicle, a vehicle side receiving device for receiving the alternating electromagnetic field and for producing electric energy by magnetic induction, wherein the wayside electric conductor arrangement is combined with an array of a plurality of sensor coils, the sensor coils being placed side by side to form the array, the array extends in directions transverse to a field direction of the electromagnetic field, which field direction extends from the wayside electric conductor arrangement to the vehicle side receiving device during transfer of the energy to the vehicle, a detector arrangement is connected to the plurality of the sensor coils, the detector arrangement being adapted to detect an effect of any magnetic and/or electrically conducting body, that is possibly located in the field direction, on at least one electrical property of at least one of the sensor coils, at least one marker body, which is a magnetic and/or electrically conducting body, is combined with the vehicle side receiving device, a position determining device is connected to the detector arrangement and is adapted to determine a position of the vehicle side receiving device from a detection result of the detector arrangement, the detection result indicating the sensor coil/sensor coils which is/are nearest to the marker body.

The invention also includes an arrangement comprising the wayside electric conductor arrangement which is combined with the array of plurality of sensor coils, according to any embodiment of the system.

In addition, the invention includes a vehicle comprising the vehicle side receiving device and the at least one marker body according to any embodiment described herein.

The vehicle may be a rail vehicle or a bus. In particular, the vehicle may be a vehicle for transport of passengers, for example a road automobile.

Furthermore, a method is proposed of operating an inductive power transfer system for transferring electric energy to a vehicle, wherein
a wayside electric conductor arrangement produces an alternating electromagnetic field and thereby transfers the energy to the vehicle,
a vehicle side receiving device receives the alternating electromagnetic field and produces electric energy by magnetic induction,
the wayside electric conductor arrangement is operated in combination with an array of a plurality of sensor coils, the sensor coils being placed side by side to form the array,
the array extends in directions transverse to a field direction of the electromagnetic field, which field direction extends from the wayside electric conductor arrangement to the vehicle side receiving device during transfer of the energy to the vehicle,
a detector arrangement, which is connected to the plurality of the sensor coils, detects an effect of any magnetic and/or electrically conducting body, that is possibly located in the field direction, on at least one electrical property of at least one of the sensor coils,
at least one marker body, which is a magnetic and/or electrically conducting body, is used in combination with the vehicle side receiving device,
a position determining device, which is connected to the detector arrangement, determines a position of the vehicle side receiving device from a detection result of the detector arrangement, the detection result indicating the sensor coil/sensor coils which is/are nearest to the marker body.

Also, a method is proposed of manufacturing an inductive power transfer system for transferring electric energy to a vehicle, in particular any embodiment of the system described herein, wherein the following is provided:
a wayside electric conductor arrangement for producing an alternating electromagnetic field and for thereby transferring the energy to the vehicle,
a vehicle side receiving device for receiving the alternating electromagnetic field and for producing electric energy by magnetic induction,
wherein
the wayside electric conductor arrangement is combined with an array of a plurality of sensor coils, the sensor coils being placed side by side to form the array,
the array extends in directions transverse to a field direction of the electromagnetic field, which field direction extends from the wayside electric conductor arrangement to the vehicle side receiving device during transfer of the energy to the vehicle,
a detector arrangement is connected to the plurality of the sensor coils, the detector arrangement being adapted to detect an effect of any magnetic and/or electrically conducting body, that is possibly located in the field direction, on at least one electrical property of at least one of the sensor coils,
at least one marker body, which is a magnetic and/or electrically conducting body, is combined with the vehicle side receiving device,
a position determining device is connected to the detector arrangement and is adapted to determine a position of the vehicle side receiving device from a detection result of the detector arrangement, the detection result indicating the sensor coil/sensor coils which is/are nearest to the marker body.

The primary side conductor arrangement may comprise at least one coil of an electric line, as mentioned above. The conductor arrangement may be operated by conducting a single phase or a plural phase alternating electric current. In case of a plural phase current, the conductor arrangement comprises at least the number of coils which corresponds to the number of phases. In addition or alternatively, the conductor arrangement may comprise a plurality of coils per phase.

The vehicle side (secondary) receiving device may also comprise at least one coil of an electric line, so that a single phase or plural phase electric current may be produced. The receiving device may be mounted to the vehicle so that it is onboard the vehicle. It may be mounted at the bottom of the vehicle and, optionally, may be combined with a moving device for moving it towards the primary side conductor arrangement in order to reduce the gap between the receiving device and the conductor arrangement.

In particular, the predetermined range of positions in which the secondary side receiving device is to be positioned relative to the primary side conductor arrangement during operation of the IPT system may have a dimension of several centimeters in lateral direction or in different lateral directions which are perpendicular to each other. One of the lateral directions or the lateral direction may be the driving direction of the vehicle.

According to a preferred embodiment, the IPT system is only operated if the secondary side receiving device is in the predetermined position or in the predetermined range of positions. Optionally, the IPT system is only operated if the secondary side receiving device is aligned in a predetermined manner, i.e. there may be one predetermined alignment or a range of predetermined alignments. The term "alignment" means that the receiving device has a corresponding orientation with respect to a plane which extends perpendicularly to the field direction of the electromagnetic field mentioned above. If the primary side conductor arrangement and the secondary side receiving device are monolithic bodies having plane surfaces facing each other during operation, the normal direction to the facing surfaces is also the direction of the magnetic field lines (within the region of the highest magnetic field intensity).

In particular, the areas which are enclosed or covered by the sensor coils and which are parts of the array of the sensor coils are oriented perpendicularly to the direction of the magnetic field lines in the region of the highest magnetic field intensity. In this case, the array of the sensor coils has the highest sensitivity to any magnetic and/or electrically conducting body in the region between the primary side and the secondary side of the system, to the marker body or marker bodies which is/are combined with the receiving device and to any communication signal transmitted from the receiving device.

Preferably, the array of sensor coils is placed in between the primary side conductor arrangement and the secondary side receiving device. If the IPT system is not operated and there is no secondary side receiving device in the region where effective magnetic induction for energy transfer may occur, the preferred location of the array of sensor coils can be defined as a location on the side of the primary side conductor arrangement on which the secondary side receiving device is to be placed for operation of the IPT system. This has the advantage that the sensor coils are more sensitive for the detection and position determination compared to the location on the other side of the primary side conductor arrangement. However, it is also possible to place the array of sensor coils within the area or the areas which are enclosed by at least one coil of the primary side conductor arrangement. In the standard case in which the primary side conductor arrangement is placed in the ground and/or on the ground and in which the secondary side receiving device is placed above, this means that the array may be placed on the same height level as the primary side conductor arrangement or preferably above this level.

In particular, the detector arrangement is electrically connected or connectable to each of the sensor coils of the array. For example, it is connectable to the sensor coils via a multiplexor switch, so that only one of the sensor coils is connected to the detector arrangement at a time.

Different function principle, so that the effect of any magnetic and/or electrically conducting body can be detected, can be realized by the same embodiment or by different embodiments of the system. In particular, a magnetic field may be generated using at least one coil, which may be a coil or coils of the array or may be at least one different coil, and the response of the electrically conducting body may be observed using the individual sensor coils. In particular, the sensor coil which produces the highest induction voltage caused by the response of the body is the sensor coil nearest to the body. The same applies to the detection of magnetic bodies. However, in this case there is no need for the generation of a magnetic field using a coil, since the body is already magnetic.

According to another function principle, pulse induction is applied. This function principle is known from the technical field of locating metal objects buried in the ground. The advantage is that there is no need for separate coils which produce the magnetic field. Rather, a high-voltage pulse is applied to the coil and produces a corresponding electromagnetic field pulse. In the absence of metal, the pulse decays in a characteristic manner and the decay time can be measured. However, if an electrically conducting body is present, an electric current is induced in the body and the decay time of the voltage at the sensor coil is affected. The decay time can be measured for the different sensor coils and it can be determined which sensor coil or sensor coils is/are nearest to the body. According to a modification of the function principle, the high voltage is applied only to one or some of the sensor coils of the array and the other sensor coils are only used to measure the response of any electrically conducting body. In particular, the detector arrangement and/or the position determining device can be trained to determine whether and near which of the sensor coils there is a magnetic and/or electrically conducting body.

In particular, the position determining device evaluates the measurement results of the detector arrangement for each individual sensor coils and determines the position of the body by identifying the nearest sensor coil(s). The identified position corresponds to the position of the nearest sensor coil(s) within the array.

According to a preferred embodiment of the method of operating, the position determining device determines the position of the marker body or the positions of the marker bodies and, thereby, of the vehicle side receiving device by evaluating at least one electrical property of at least one of the sensor coils, which electrical property is detected by the detector arrangement, thereby detecting the sensor coil/ sensor coils which is/are the nearest one(s) to the respective marker body. Depending on the function principle (see above) of the detector arrangement and of the position determining device a corresponding electrical property is detected. For example, the electrical property is the magnitude of a voltage induced in the sensor coil, a phase shift of a frequency of an alternating voltage induced in the sensor coil, which phase shift is caused by the body to be detected, or the decay time mentioned above.

Preferably, an operation of the IPT system is prohibited (for example by switching off the alternating electric current through the primary side conductor arrangement) if an object in between the primary side conductor arrangement and the secondary side receiving device is detected using the detector arrangement. Alternatively, the power produced by the primary side conductor arrangement may be reduced, in particular by reducing the alternating electric current through the conductor arrangement.

In particular, the vehicle side receiving device is combined with a communication transmitter adapted to transmit communication signals to the array of the sensor coils, wherein the detector arrangement and/or a communication receiver, that is connected to the plurality of the sensor coils, is/are adapted to receive the communication signals via at least one of the sensor coils.

In particular, the vehicle side receiving device is combined with a communication transmitter adapted to transmit communication signals to the array of the sensor coils, wherein the detector arrangement and/or a communication receiver, that is connected to the plurality of the sensor coils, is/are adapted to receive the communication signals via at least one of the sensor coils.

Accordingly, at least one sensor coil is not only used for body detection, but also for receiving communication signals from the vehicle side communication transmitter. For example, these communication signals can be used in the process of positioning the vehicle and/or the receiving device relative to the primary side conductor arrangement. In addition or alternatively, these communication signals can be used during the process of transferring energy to the vehicle, for example in order to signal that the power of transfer can be reduced or the power transfer can be stopped. Alternatively or in addition, it is possible to transmit communication signals from the wayside to the vehicle. In particular, at least one of the sensor coils can be used as the antenna of a wayside communication transmitter.

For receiving and/or transmitting communication signals using at least one of the sensor coils, the position determining device may be adapted to perform the function of a receiver and/or transmitter.

According to a particular embodiment, the communication transmitter is fixed relative to the vehicle side receiving device, wherein the position determining device is adapted to determine a position of the communication transmitter and, thereby, of the vehicle side receiving device by detecting the sensor coil/sensor coils which is/are the nearest one(s) to the communication transmitter.

According to a particular embodiment, the communication transmitter is fixed relative to the vehicle side receiving device, wherein the position determining device is adapted to determine a position of the communication transmitter and, thereby, of the vehicle side receiving device by detecting the sensor coil/sensor coils which is/are the nearest one(s) to the communication transmitter.

The position determining device may be connected to the wayside communication receiver or may be adapted to perform the function of the communication receiver. In any case, the position determining device can determine the position of the vehicle side receiving device, using the effect of the communication signals on the at least one signal receiving sensor coil alone, or in combination with the position determination based on at least one marker, as described above. Therefore, the communication transmitter may replace one marker or additional information concerning the position of the receiving device or the alignment of the receiving device is available to the position determining device.

The vehicle side receiving device may comprise the at least one marker body of magnetic and/or electrically conducting material. For example, the at least one marker body may be fixed to the receiving device or a part of the receiving device may be formed by magnetic and/or electrically conducting material. In these cases, the marker body or bodies and the receiving device constitute an integral part and the location of the marker body relative to the receiving device is fixed.

As mentioned before, the system may be adapted to operate the wayside electric conductor arrangement only if the determined position of the vehicle side receiving device fulfills a predetermined condition. In particular, the predetermined condition defines that the determined position must be a predetermined position. Alternatively, it may define that the determined position must be within a range of predetermined positions.

In addition or alternatively, the system may be adapted to operate the wayside electric conductor arrangement only if an alignment of the vehicle side receiving device, which is determined from at least two of the determined positions, fulfills a predetermined condition. In particular, the predetermined condition may define that the determined alignment is a predetermined alignment or alternatively within a range of predetermined alignments. The at least two determined positions comprise
the determined position of the communication transmitter and optionally the determined position of a further (second) communication transmitter that is fixed relative to the vehicle side receiving device and/or
the determined position of the marker body or the determined positions of a plurality of the marker bodies.

In particular, it is possible to use only determined positions of marker bodies for the determination of the alignment of the receiving device, for example if there is no communication transmitter in the specific embodiment of the system.

Embodiments of the method of operating an IPT system and of the method of manufacturing an IPT system follow from the above description, i.e. there are method embodiments corresponding to the described system embodiments.

In particular, the array of sensor coils is a two dimensional array, i.e. there are at least two sensor coils at different positions with respect to two different directions which extend perpendicularly to each other. These two directions are preferably perpendicular to the direction of magnetic field lines of the magnetic field which is produced by the primary side conductor arrangement in the region having the highest magnetic field intensity. In particular, a matrix of the sensor coils with the sensor coils being arranged in rows and columns may comprise at least three sensor coils in each row and in each column.

In particular, the center of the array or a central region of the array is arranged concentric with the center or central region of the primary side conductor arrangement. In particular, the lateral dimensions in two lateral directions of the array on one hand and of the primary side conductor arrangement on the other hand may be equal or, alternatively, the lateral dimensions of the array may be larger than the lateral dimensions of the primary side conductor arrangement.

In any case, such an arrangement comprising the array and the primary side conductor arrangement has the advantage that positioning of the secondary side receiving device above the center of the primary side conductor arrangement is facilitated and foreign metal and/or magnetic objects can be detected at least above the central region of the primary side conductor arrangement.

Preferably, the predetermined range of positions in which the secondary side receiving device is to be located during operation of the IPT system, is predetermined (i.e. predefined) as a range being concentric with the primary side conductor arrangement. In particular, at least one marker body and/or the communication transmitter may be located in a central region of the vehicle side receiving device and the IPT system is only operated or only operated at full power if this at least one marker body or communication transmitter is determined to be in the predetermined range of positions.

Preferably, there are two marker bodies at the vehicle side receiving device, which marker bodies are positioned at a distance to each other. Furthermore, it is preferred that these two marker bodies are located at the right hand side and the left hand side of the receiving device with reference to the driving direction of the vehicle so that the direction of a hypothetical straight line which connects the two marker bodies extends transversely (in particular perpendicularly) to the driving direction. This has the advantage that the alignment of the receiving device, while the vehicle is moving into the position in which the energy is transferred from the primary side conductor arrangement to the secondary side receiving device on the vehicle, can be determined easily as soon as the positions of the marker bodies relative to the primary side conductor arrangement can be detected by the detector arrangement. This is particularly the case if the marker bodies are in between the array and the region where the secondary side receiving device is to be positioned.

It is also preferred that the two marker bodies are located in the front region of the receiving device with respect to the vehicle's driving direction. In this case, the two marker bodies reach the region in between the array and the receiving device earlier compared to the case in which they are located in a rear region of the receiving device.

BRIEF DESCRIPTION OF THE DRAWINGS

In the following, embodiments and examples of the invention are described with reference to the attached figures. The figures show schematically.

DETAILED DESCRIPTION OF THE INVENTION

Figure 1:
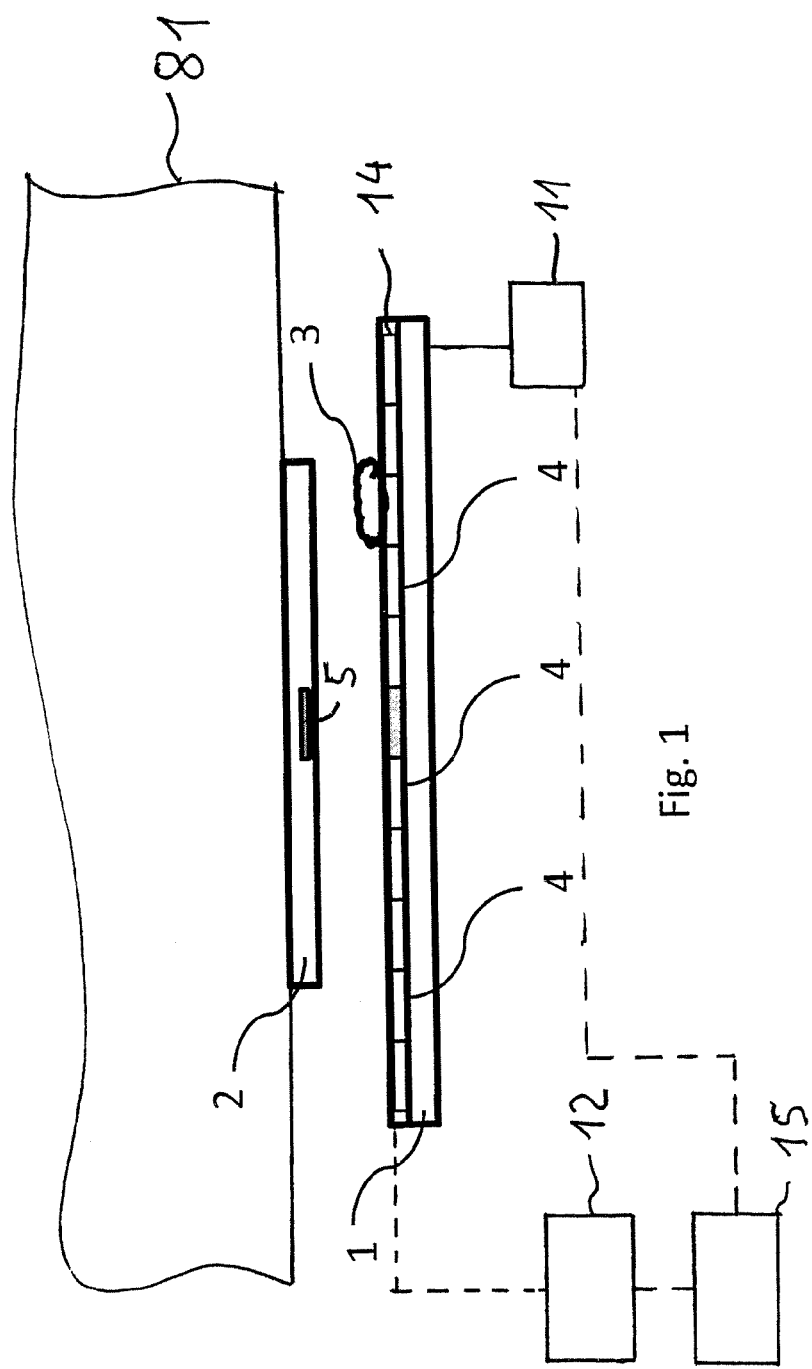
FIG. 1 a side view of an IPT system.

FIG. 1 shows a primary side (wayside) electric conductor arrangement 1 for producing an alternating electromagnetic field and for thereby transferring energy to a vehicle 81, a part of which vehicle is schematically indicated in the upper part of FIG. 1. At the bottom of the vehicle 81, a secondary side (vehicle side) receiving device 2 is mounted to the vehicle 81 for receiving the alternating electromagnetic field and for producing electric energy by magnetic induction. For example, the electric energy is used to charge an energy storage of the vehicle 81 and/or is directly used for operating the vehicle, such as on-board electric and electronic devices.

Figure 2:
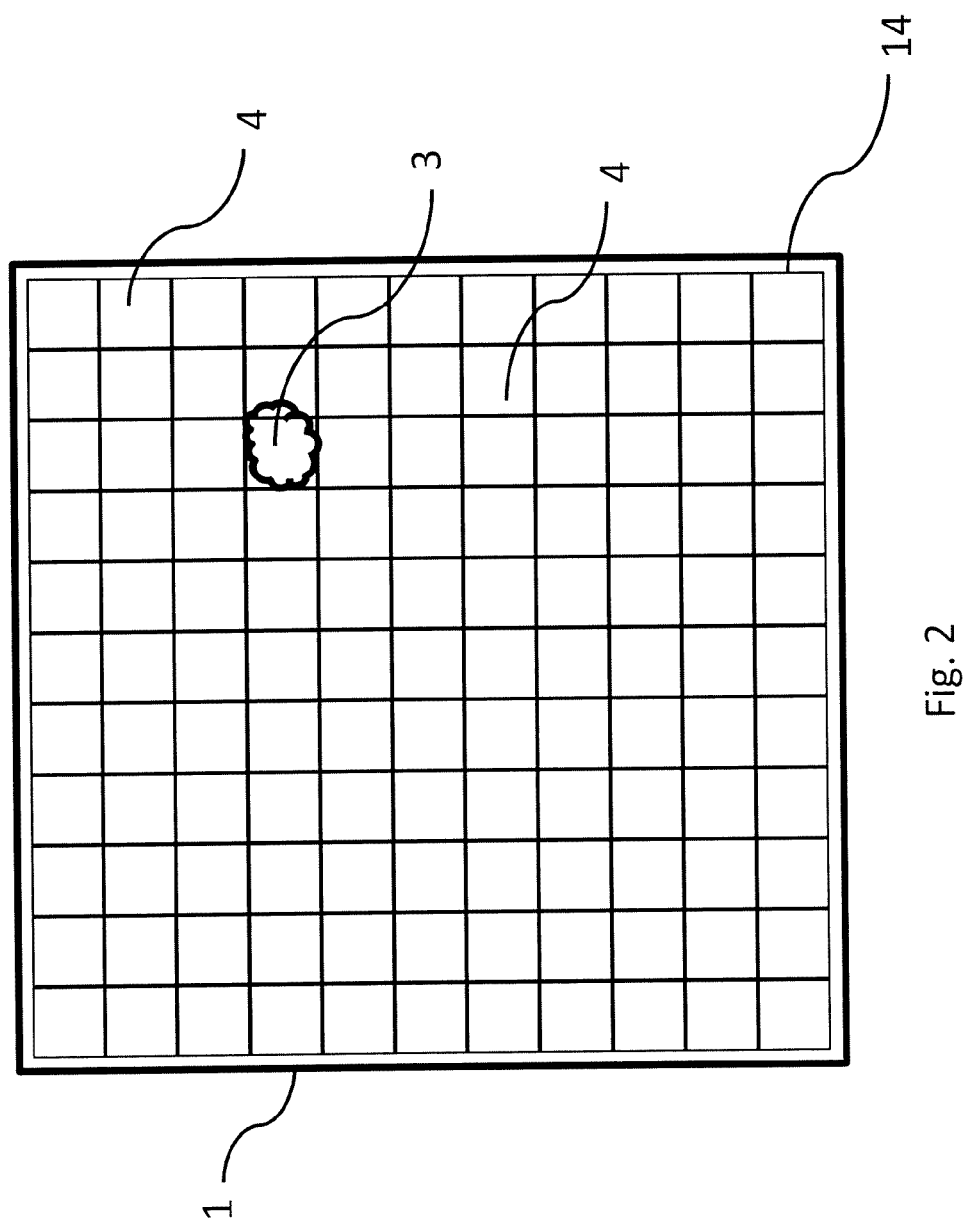
FIG. 2 a top view on the primary side (wayside) part of the system shown in FIG. 1, FIG. 3 a side view of an IPT system, which may be the system shown in FIG. 1 and FIG. 2, wherein the secondary side receiving device is not completely positioned above the primary side part of the system, FIG. 4 a top view of the system of FIG. 3 with the primary side parts and the secondary side parts of the system being in the same relative position as shown in FIG. 3, FIG. 5 a top view of an IPT system similar to the systems shown in FIG. 1 to FIG. 4, wherein the secondary side receiving device comprises two marker bodies which are positioned at a distance to each other and wherein on the right hand side of the figure a display view is shown which may be displayed to the driver of the vehicle for indicating the current position and alignment of the secondary side receiving device relative to the primary side electric conductor arrangement, FIG. 6 the system of FIG. 5, wherein the secondary side receiving device is in a different position and alignment relative to the primary side parts of the system and wherein a corresponding display view is shown on the right hand side of the figure, and FIG. 7 the system of FIG. 5 and FIG. 6, wherein the secondary side receiving device has reached an optimum position and alignment relative to the primary side conductor arrangement and wherein a corresponding display view is shown on the right hand side of the figure.

In between the conductor arrangement 1 and the receiving device 2, there is an array 14 of a plurality of sensor coils 4 which are arranged (as shown in FIG. 2) in rows and columns, thereby forming a matrix. Some of the sensor coils are denoted by reference numeral 4. As shown in FIG. 2, there are one hundred and twenty one sensor coils 4 in the example. Other embodiments of the array may comprise a different number of coils per row and/or column. Preferably, the areas of the sensor coils of the array have the same sizes. The areas shown in FIG. 2 are quadratic areas and may be the areas which are enclosed by the respective sensor coil 4.

The array 14 is placed directly above the conductor arrangement 1, which, for example, may be housed by the same housing.

There is an electrically conducting object 3, for example a metal object, in between the array 14 and the receiving device 2. During operation of the IPT system, the object 3 would be heated repeatedly. This foreign object 3 is to be detected using the array 14. As shown in FIG. 2, the object 3 rests on the area of the sensor coil in the fourth row and the ninth column.

A detector arrangement 12 is connected to the plurality of sensor coils 4, the detector arrangement being adapted to detect an effect of any magnetic and/or electrically conducting body, such as the object 3, on at least one electrical property of at least one of the sensor coils 4. A position determining device 15 is connected to the detector arrangement 12 and is adapted to determine the sensor coil 4 which is nearest to the foreign object 3 or is adapted to determine that a body, which is detected by the detector arrangement 12, is a foreign object, i.e. not a marker that is part of the vehicle 81 or part of the receiving device 2.

Figure 5:
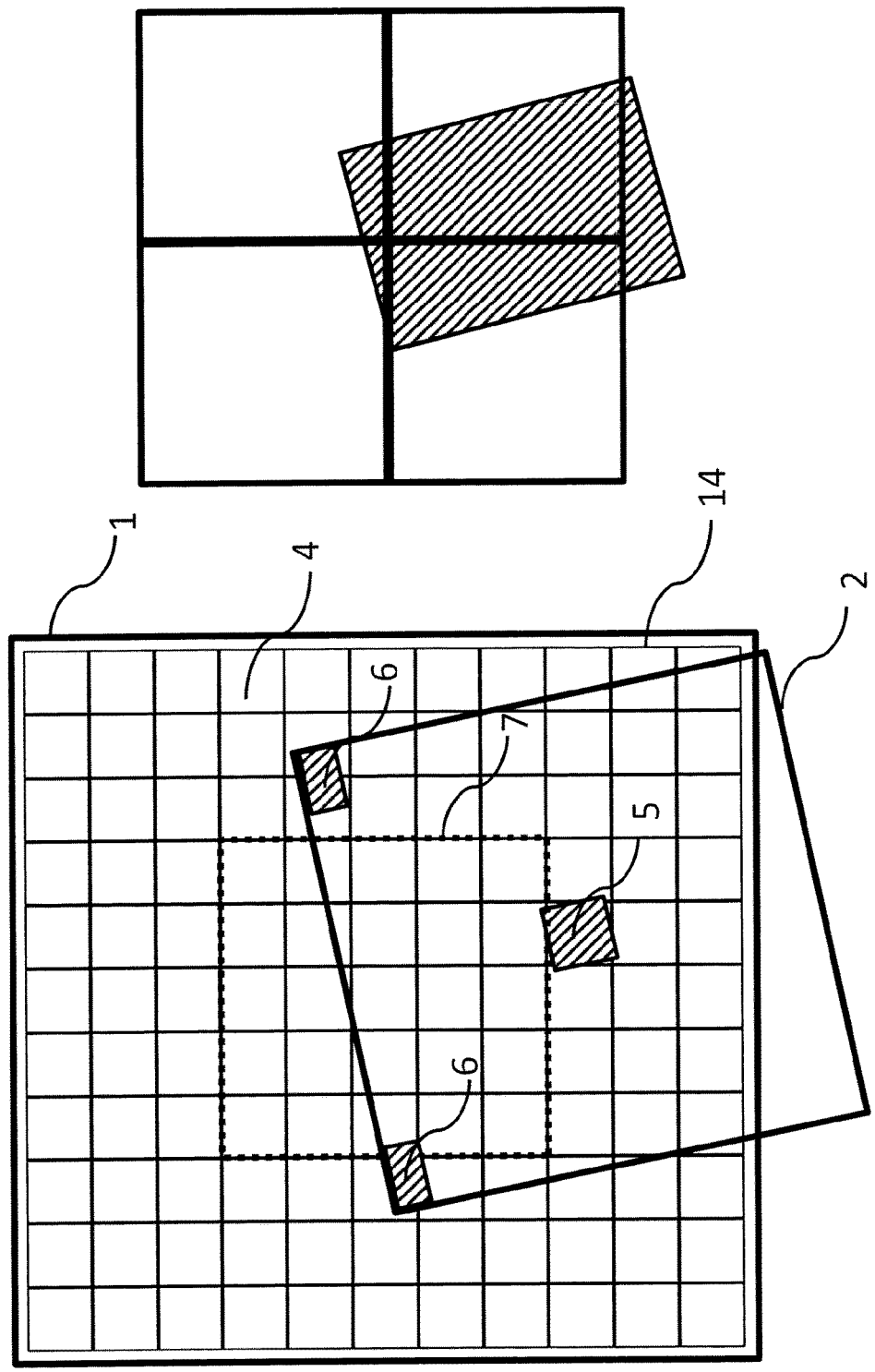
Figure 6:
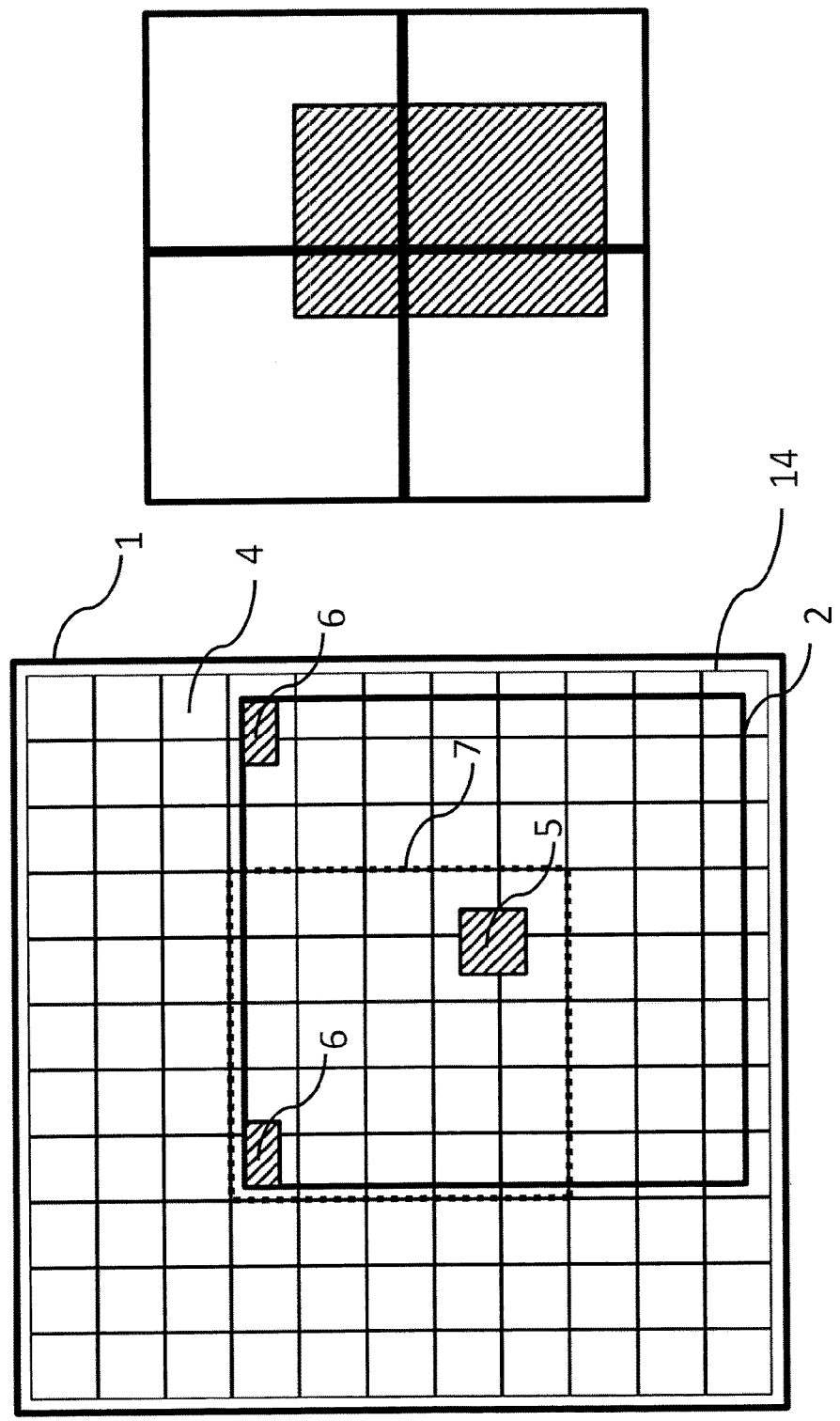
Figure 7:
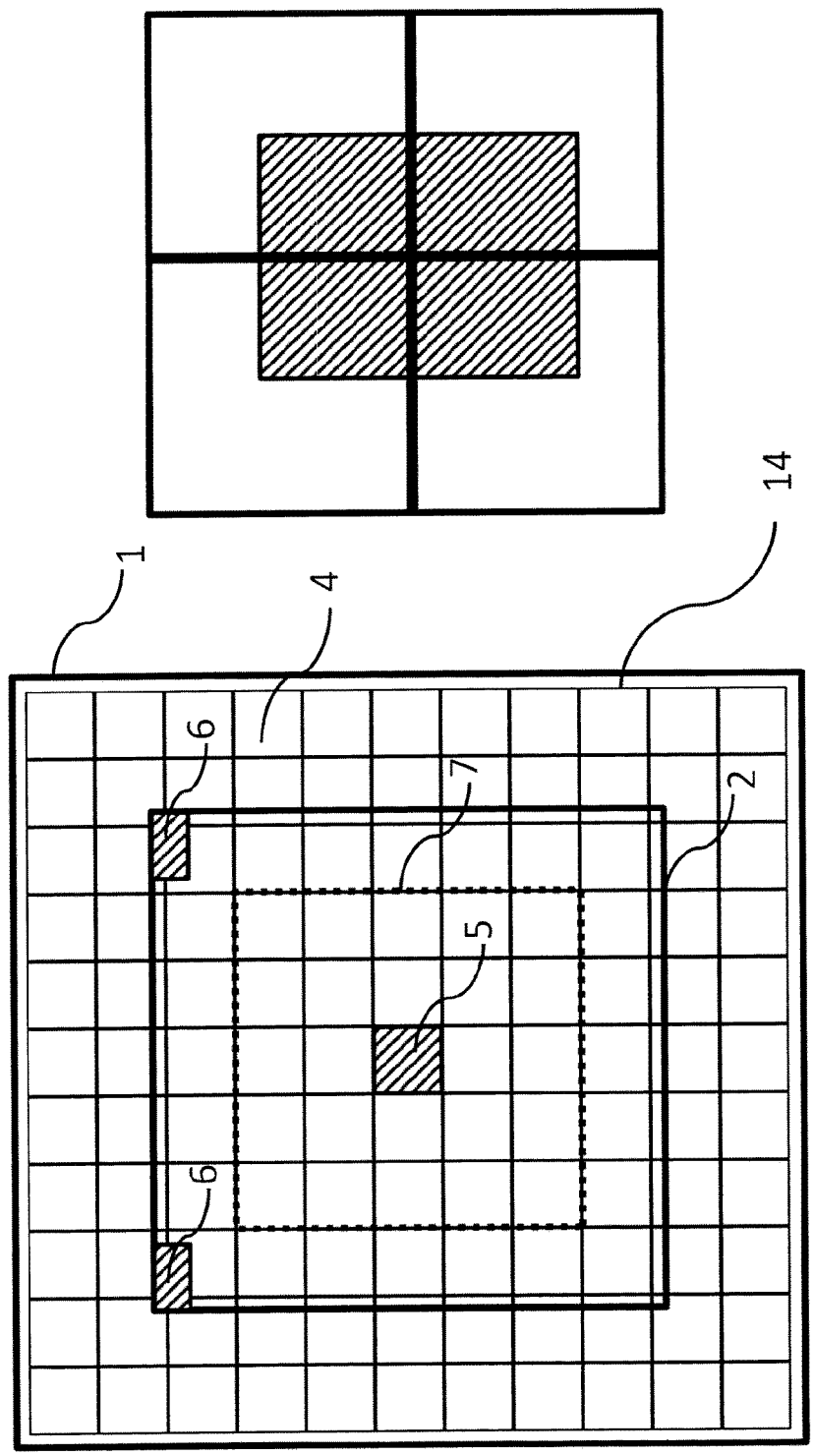

In addition or alternatively, the position determining device is adapted to determine a position of the vehicle side receiving device 2 from a detection result of the detector arrangement 12, wherein the detection result indicates the sensor coil 4 or the sensor coils 4 which is/are nearest to a marker body being part of the vehicle 81 or the receiving device 2. Such marker bodies are shown in FIG. 5 to FIG. 7 and will be described later. The receiving device 2 shown in FIG. 1 may comprise at least one marker body.

Furthermore, in addition or alternatively, the position determining device 15 is adapted to determine a position of the vehicle side receiving device 2 from a detection result of the detector arrangement 12, wherein the detection result indicates the sensor coil 4 or sensor coils 4 which is/are nearest to a vehicle side communication transmitter 5. In this case, the detector arrangement 12 detects the sensor coil 4 which receives the communication signal transmitted by the communication transmitter 5 having the strongest reception signal, i.e. in which the highest voltage is induced by the communication signal.

In all cases with respect to the functionality of the position determining device and/or of the detector arrangement mentioned before, the detected position corresponds to the position of the respective nearest sensor coil in the matrix of sensor coils. The functionality mentioned before can be realized as well in other embodiments of an IPT system.

A foreign object, such as the metal object 3, can be recognized by the position determining device 15, for example, using the information about the position of the communication transmitter 5 and/or about the position of any marker body 6 as shown, for example, in FIG. 5 to FIG. 7. In particular, the position determining device 15 may have stored the additional information about the relative positions of a plurality of positions, being the positions of at least one marker body and/or at least one communication transmitter on the vehicle side. The position determining device 15 can compare the additional information with the current information about the determined positions and may come to the conclusion that one of the positions is not the position of a marker body or of a communication transmitter on the vehicle side, but the position of a foreign object 3. In addition or alternatively, the position determining device 15 may directly obtain the information that a foreign object 3 is present from the detection result of the detector arrangement 12. In particular, the at least one electrical property of the sensor coil 4 nearest to the foreign object 3 which electrical property is affected by the foreign object 3 may be measured by the detector arrangement may and evaluated by the position determining device 15.

If a foreign object 3 is detected by the position determining device 15 (or by the detector arrangement 12), the position determining device 15 triggers a control unit 11 of the conductor arrangement 1 to prohibit or stop operating the conductor arrangement 1 or, alternatively, limiting the power produced by the conductor arrangement 1.

Figure 3:
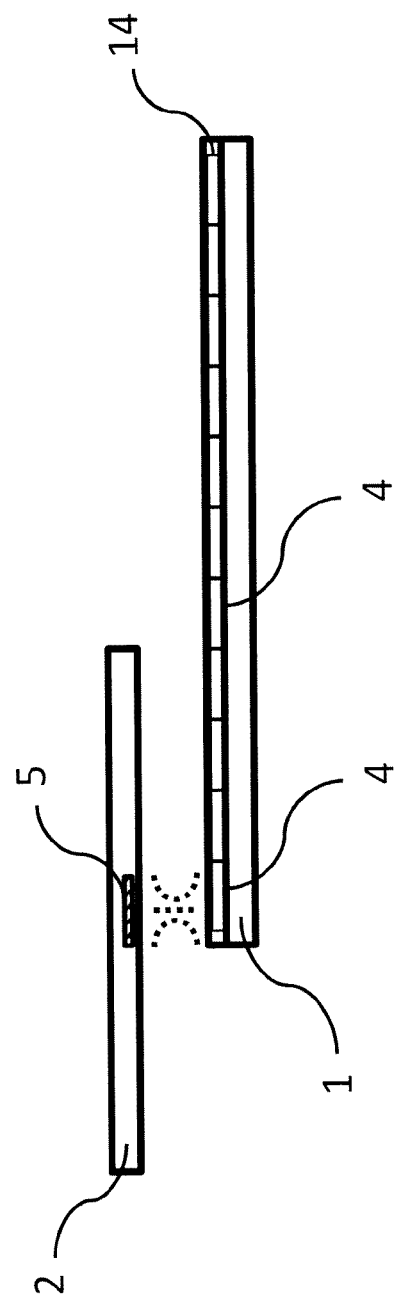

In particular, as shown for example in FIG. 1 and FIG. 3, the array of a plurality of sensor coils 4 may have the form of a layer in the region in between the primary side conductor arrangement and the secondary side receiving device.

Figure 4:
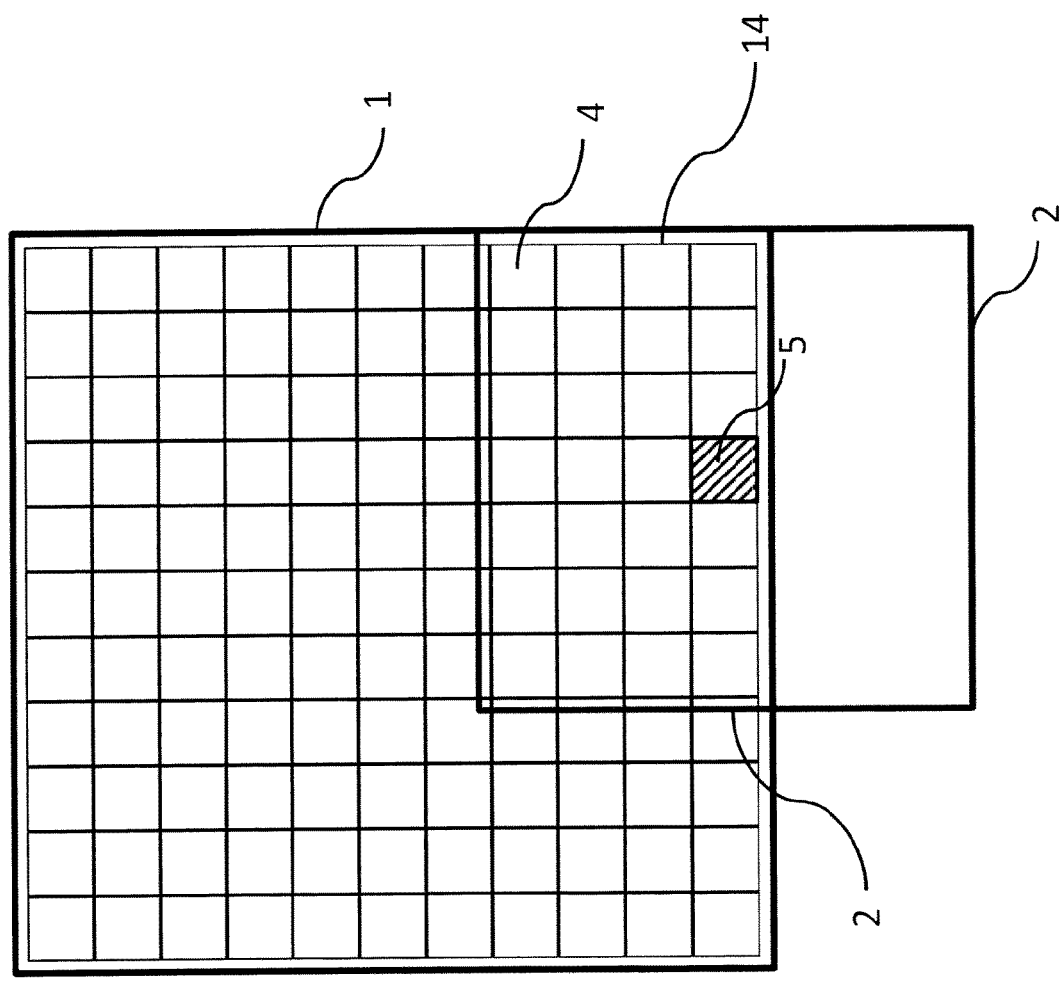

As shown in FIG. 3 and FIG. 4, the communication transmitter 5 which may be placed in the center of the receiving device 2 (see FIG. 4) has reached a position above the array 14. Therefore, communication signals can be transferred from the communication transmitter 5 to the primary side parts of the system, in particular using at least one of the sensor coils 4 as receiving antenna. Vice versa, at least one of the sensor coils 4 may be used as transmitting antenna for transmitting a communication signal to the receiving device 2. In particular, the communication transmitter 5 may be a transceiver which is capable of also receiving communication signals.

The relative position and alignment of the receiving device 2 and the array 14 in combination with the conductor arrangement 1 as shown in FIG. 3 and FIG. 4 may correspond to a point in time during the process of moving the receiving device 2 in a position in which the IPT system is operated. As soon as the communication transmitter 5 has reached the region above the array 14, a communication process is started between the vehicle side part of the system and the wayside part of the system. In particular, the current position of the communication transmitter 5 is determined by determining the nearest sensor coil 4. This position information can be used to steer the vehicle or the receiving device 2 into the desired position for operating the IPT system. For example, the receiving device 2 has moved from left to right in FIG. 3 and from bottom to top in FIG. 4 so as to reach the position as shown in FIG. 3 and FIG. 4. Therefore, the vehicle or the receiving device 2 should be moved more to the left in FIG. 4 in order to place the receiving device 2 concentric to the array 14.

The receiving device 2 shown in FIG. 5 to FIG. 7 comprises two marker bodies 6 which are placed at a distance to each other, wherein the hypothetical connecting line between the two marker bodies 6 extends perpendicularly to the driving direction (the vertical direction in FIG. 6) and a direction slightly inclined to the vertical direction in FIG. 5. The driving direction in FIG. 5 and FIG. 6 is the direction parallel to the left and right edge of the quadratic receiving device 2 shown. Furthermore, the marker bodies 6 are arranged in the front region of the receiving device 2.

The receiving device 2 has reached the position shown in FIG. 5 during the process of moving the receiving device 2 to the position concentric with the array 14.

The center region 7 of the array 14 which comprises in the example twenty-five sensor coils 4 is outlined by a dashed line in FIG. 5 to FIG. 7. According to a preferred embodiment, the IPT system is only operated if the communication transmitter 5 is placed above this center region 7 of the array 14. Therefore, the system cannot be operated in the position shown in FIG. 5 yet.

FIG. 6 depicts a later point in time during the process of moving the receiving device 2. In the meantime, the center of the receiving device 2, where the communication transmitter 5 is located, has reached the center region 7 of array 14. Therefore, the operation of the IPT system may start, although the receiving device 2 has not reached the concentric position with the array 14, which is shown in FIG. 7 as the final position of the moving process.

In the earlier position shown in FIG. 5, the alignment of the receiving device 2 is not the same as the desired alignment shown in FIG. 6 and FIG. 7. In order to not only move the receiving device 2 in the concentric position to the array 14, but also adjust the alignment to a predetermined, desired alignment, the position of the marker bodies 6 is determined by the position determining device, such as the device 15 of FIG. 1 and the alignment is determined from these positions. In addition or alternatively, the position of the communication transmitter 5 is used to determine the alignment of the receiving device 2 relative to the array 14.

In order to steer the vehicle or the receiving device 2 in the desired position relative to the conductor arrangement 1 and, optionally, in order to align the receiving device 2 in a desired manner, the position information and optionally the alignment information obtained by the primary side parts of the system is/are used. In particular, the information obtained can be processed by the primary side parts of the system and/or can be transferred to the vehicle side. For example, in order to determine that the receiving device 2 is aligned in a desired manner, the sensor coils 4 which are nearest to the marker bodies 6 must be within the same row of sensor coils.

The invention claimed is:

1. An inductive power transfer system for transferring electric energy to a vehicle, wherein the system comprises
    a wayside electric conductor arrangement for producing an alternating electromagnetic field and for thereby transferring the energy to the vehicle; and
    a vehicle side receiving device for receiving the alternating electromagnetic field and for producing electric energy by magnetic induction,
    wherein:
    the wayside electric conductor arrangement is combined with an array of a plurality of sensor coils, the sensor coils being placed side by side to form the array,
    the array extends in directions transverse to a field direction of the electromagnetic field, which field direction extends from the wayside electric conductor arrangement to the vehicle side receiving device during transfer of the energy to the vehicle,
    a detector arrangement is connected to the plurality of the sensor coils, the detector arrangement being adapted to detect an effect of any magnetic and/or electrically conducting body, that is possibly located in the field direction, on at least one electrical property of at least one of the sensor coils,
    the vehicle side receiving device is combined with a communication transmitter adapted to transmit communication signals to the array of the plurality of sensor coils, wherein the detector arrangement and/or a communication receiver, that is connected to the plurality of the sensor coils, is/are adapted to receive the communication signals via at least one of the plurality of sensor coils, and
    the system is adapted to use a communication signal received via at least one of the plurality of sensor coils to detect a position of the vehicle side receiving device.

2. The system of claim 1, wherein a position determining device of the system is adapted to determine a position of the communication transmitter and, thereby, of the vehicle side receiving device by detecting a sensor coil of the array of the plurality of sensor coils or by detecting sensor coils of the array of the plurality of sensor coils which is/are nearest to the communication transmitter.

3. The system of claim 1, wherein the detector arrangement and/or a position determining device of the system is adapted to determine whether and near which of the plurality of the sensor coils there is a magnetic and/or electrically conducting body.

4. The system of claim 1, wherein the system is adapted to operate the wayside electric conductor arrangement only if an alignment of the vehicle side receiving device, which is determined from at least two determined positions, fulfils a predetermined condition, wherein the at least two determined positions comprise a determined position of the communication transmitter.

5. The system of claim 1, wherein the system is adapted to operate the wayside electric conductor arrangement only if the determined position of the vehicle side receiving device fulfils a predetermined condition.

6. An arrangement for transferring electric energy to a vehicle, comprising
a wayside electric conductor arrangement for producing an alternating electromagnetic field and for thereby transferring the energy to a vehicle,
an array of a plurality of sensor coils,
a detector arrangement that is connected to the plurality of the sensor coils, the detector arrangement being adapted to detect an effect of any magnetic and/or electrically conducting body, that is possibly located in the field direction of the alternating electromagnetic field, on at least one electrical property of at least one of the sensor coils,
wherein the detector arrangement and/or a communication receiver, that is connected to the plurality of the sensor coils, is/are adapted to receive communication signals from a vehicle side communication transmitter via at least one of the plurality of sensor coils and
wherein the arrangement is adapted to use a communication signal received via at least one of the plurality of sensor coils to detect a position of a vehicle side receiving device for receiving the alternating electromagnetic field and for producing electric energy by magnetic induction.

7. The arrangement of claim 6, wherein a position determining device of the arrangement is adapted to determine a position of a vehicle side communication transmitter by detecting a sensor coil of the array of the plurality of sensor coils or by detecting sensor coils of the array of the plurality of sensor coils which is/are nearest to the communication transmitter.

8. A method of operating an inductive power transfer system for transferring electric energy to a vehicle, the method comprising:
producing, by a wayside electric conductor arrangement, an alternating electromagnetic field that thereby transfers the energy to the vehicle,
receiving, by a vehicle side receiving device, the alternating electromagnetic field and producing from the received alternating electromagnetic field electric energy by magnetic induction,
wherein:
the wayside electric conductor arrangement is operated in combination with an array of a plurality of sensor coils, the sensor coils being placed side by side to form the array,
the array extends in directions transverse to a field direction of the electromagnetic field, which field direction extends from the wayside electric conductor arrangement to the vehicle side receiving device during transfer of the energy to the vehicle,
a detector arrangement, which is connected to the plurality of the sensor coils, detects an effect of any magnetic and/or electrically conducting body, that is possibly located in the field direction, on at least one electrical property of at least one of the sensor coils,
a communication transmitter that is combined with the vehicle side receiving device transmits a communication signal to the array of the sensor coils,
the detector arrangement and/or a communication receiver, that is connected to the plurality of the sensor coils, receive(s) the communication signal via at least one of the plurality sensor coils,
a communication signal received via at least one of the plurality of sensor coils is used to determine a position of the vehicle side receiving device.

9. The method of claim 8, further including a position determining device determining a position of the communication transmitter and, thereby, of the vehicle side receiving device by detecting a sensor coil of the array of the plurality of sensor coils or by detecting sensor coils of the array of the plurality of sensor coils which is/are nearest to the communication transmitter.

10. The method of claim 9, further including the position determining device determining that a body between the wayside electric conductor arrangement and the vehicle side receiving device, which body is detected by the detector arrangement, is a foreign body.

11. The method of claim 10, wherein the position determining device uses information about the position of the communication transmitter when the position determining device determines that the body detected by the detector arrangement is a foreign body.

12. The method of claim 11, wherein the position determining device has stored information about the relative positions of a plurality of positions, being the positions of the communication transmitter on the vehicle side, and the position determining device compares the stored information with current information about positions determined for the object.

13. The method of claim 9, wherein the system operates the wayside electric conductor arrangement only if the determined position of the vehicle side receiving device fulfils a predetermined condition.

14. The method of claim 8, further including the detector arrangement and/or a position determining device of the system determining whether and near which of the plurality of the sensor coils there is a magnetic and/or electrically conducting body.

* * * * *

UNITED STATES PATENT AND TRADEMARK OFFICE
CERTIFICATE OF CORRECTION

PATENT NO. : 10,351,006 B2  
APPLICATION NO. : 15/101596  
DATED : July 16, 2019  
INVENTOR(S) : Marnix Lannoije et al.

Page 1 of 1

It is certified that error appears in the above-identified patent and that said Letters Patent is hereby corrected as shown below:

In the Claims

Column 16, Line 12, Claim 8, delete "plurality sensor" and insert -- plurality of sensor --

Signed and Sealed this
Seventeenth Day of September, 2019

Andrei Iancu
*Director of the United States Patent and Trademark Office*